United States Patent [19]

Murzyn

[11] Patent Number: 4,760,412
[45] Date of Patent: Jul. 26, 1988

[54] APPARATUS AND METHOD FOR EXPOSING LINES ON A PHOTOSENSITIVE SURFACE

[75] Inventor: John E. Murzyn, Vernon, Conn.

[73] Assignee: Gerber Scientific Instrument Company, Inc., South Windsor, Conn.

[21] Appl. No.: 890,346

[22] Filed: Jul. 25, 1986

[51] Int. Cl.[4] ............................................ G03B 41/00
[52] U.S. Cl. ......................................................... 354/4
[58] Field of Search ............................................. 354/4

[56] References Cited

U.S. PATENT DOCUMENTS 4,209,239 6/1980 Wood et al. .............................. 354/4
4,416,522 11/1983 Webster ..................................... 354/4

Primary Examiner—Michael L. Gellner
Attorney, Agent, or Firm—McCormick, Paulding & Huber

[57] ABSTRACT

In a photoplotting apparatus and method using a flash lamp to expose a line on a photosensitive surface, and wherein the photohead has a number of apertures of different size to vary the width of the generated line, the quality of line drawn with each aperture is controlled by controlling or setting for each aperture the factor by which the flash rate of the lamp is related to the speed of the photohead. A signal representing the speed of the photohead over the photosensitive surface is divided by a division factor uniquely associated with the selected aperture to produce a flash rate command signal controlling the flash rate of the flash lamp. Taking into account the dividing factor associated with each aperture, the speed of the photohead is limited to one at which the flash lamp flashes at or slightly below its maximum flash rate, thereby producing maximum throughput for the apparatus.

13 Claims, 2 Drawing Sheets

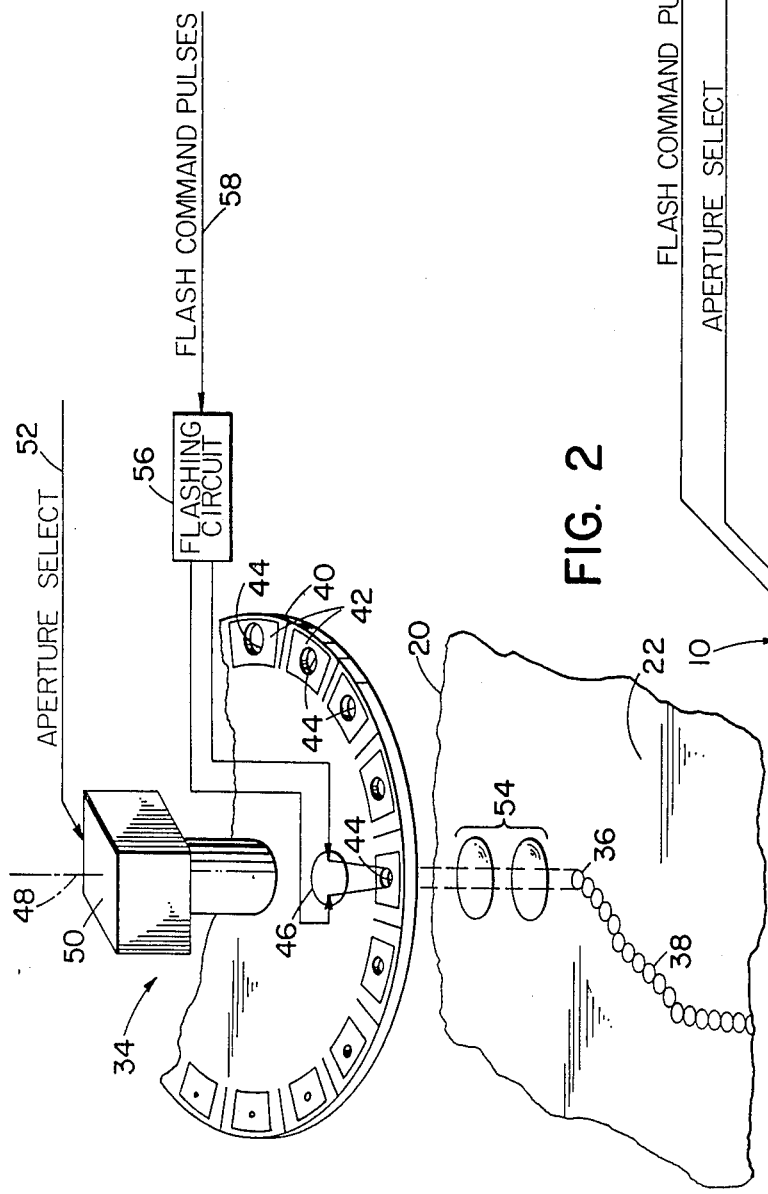
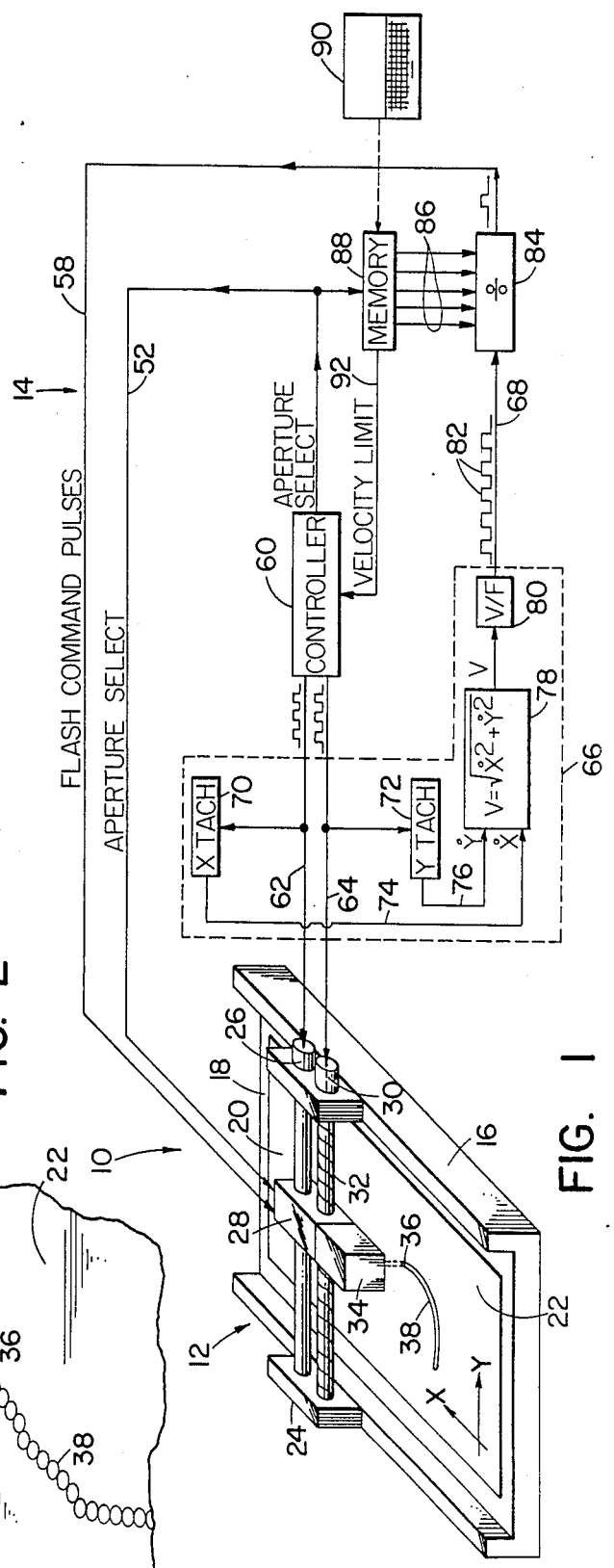
FIG. 2
FIG. 1

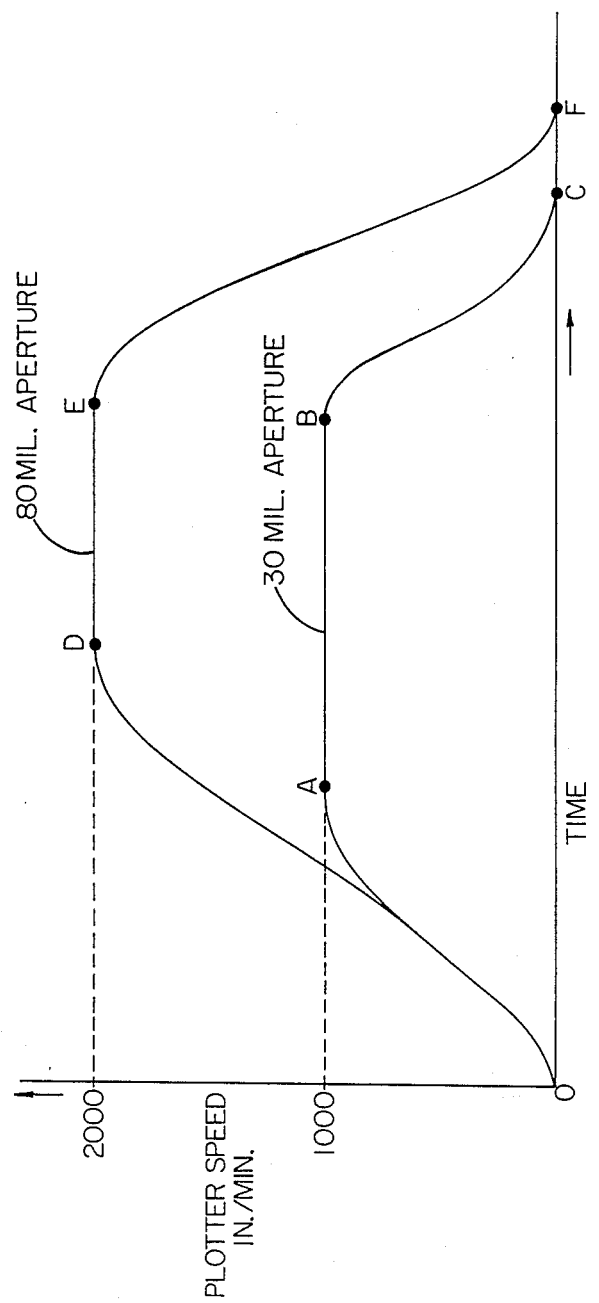

APPARATUS AND METHOD FOR EXPOSING LINES ON A PHOTOSENSITIVE SURFACE

BACKGROUND OF THE INVENTION

This invention relates to photoplotters and similar devices for exposing lines on a photosensitive surface by flashes of light produced by a flash lamp, and deals more particularly with such an apparatus and method wherein any one of a number of apertures of different size may be used with the flash lamp to control the width of the exposed line and wherein for any selected aperture the number of flashes used to expose each incremental length of the line may be set, and preferably varied, to control the quality of the resulting line.

The apparatus and method of the invention are usable in various instances wherein lines are exposed on a photosensitive surface by using a flash lamp and an associated aperture to project a plurality of overlapping light spots, usually circular shape, onto the photosensitive surface to synthesize a line. A well known application is a photoplotter wherein a sheet of material having a photosensitive surface is held to the support surface of a table while a photohead is moved in X and Y coordinate directions over the photosensitive surface to trace lines on the photosensitive surface. As this line tracing movement of the photohead occurs, a flash lamp in the photohead is flashed at such a rate that the spots projected onto the photosensitive surface overlap one another and expose the traced line.

Flash lamps have a maximum achievable flash rate at which they can be flashed; and generally in the case of a photoplotter, especially for small apertures, the maximum achievable speed of the plotter is such that when the plotter is driven at that speed the lamp cannot be flashed at a high enough rate to achieve an overlap of the projected light spots. This problem has been dealt with in the past by limiting the speed at which the photohead is driven relative to the photosensitive surface for any one of a group of differently sized apertures to one at which a suitable line can be exposed with the smallest aperture of the group, and the other apertures of the group are then fitted with filters to cause proper exposure of a line when any one of them is used as the selected aperture. That is, for a given group of apertures covering a given size range, the photohead was driven at the same limited maximum speed regardless of the aperture selected for use with the flash lamp.

The above mentioned prior art procedure of driving a photohead at the same limited maximum speed for any aperture selected from a given size group has the disadvantage of reducing the throughput of the plotter, since the photohead, except for the smallest aperture of the group, is driven at a maximum speed less than that imposed by the maximum achievable flash rate of the flash lamp. Also, in the prior art arrangement it is difficult to adust the photohead to photosensitive surfaces of different speed or sensitivity or to aging or replacement changes in the output of the flash lamp, and to otherwise control the exposure of the photosensitive surface, as to do so involves the replacement of the filters associated with the various apertures.

Also, the quality of the line exposed, as to the straightness of its edges and degree of exposure, depends on the number of spots projected or flashes generated for each increment of length of the exposed line. For circular spots the involved quanity may be stated in terms of flashes per spot diameter. For small width lines, that is lines synthesized from spots of 2 to 6 mils, lines of acceptable quality may perhaps be produced with as few as 3½ to 5 flashes per spot diameter, while, when using spots of larger diameter, for example 160 mils, as many as 14 flashes per diameter may perhaps be required to produce acceptable line quality. In any event, the number of flashes per spot diameter has an effect on line quality and in known prior art photoheads it has been impossible to individually set or vary, for each aperture, the number of flashes produced per spot diameter to gain control over line quality.

Photoheads used for exposing lines are also commonly used to expose individual features on the photosensitive surface while the photohead is held stationary relative to the surface. Such individual features are commonly referred to as "pads" and often are of circular shape. In prior art photoplotters it has generally been necessary to provide one circular aperture of a given size for pad flashing and one aperture of the same size for line drawing as most or all of the line drawing apertures have filters associated with them and all of the pad flashing apertures are unfiltered.

The general object of the invention is to provide an apparatus and method for exposing lines which avoids the above mentioned drawbacks of known prior art photoplotters. More particularly, an object of the invention is to provide an apparatus and method for exposing lines on a photosensitive surface by flashes of light wherein the throughput of the apparatus and method are greatly increased by driving the photohead for each selected aperture at a maximum limit speed corresponding to operation of the flash lamp at or near its maximum achievable flash rate.

A further object of the invention is to provide an apparatus and method of the foregoing character which allows great control over the quality of a line exposed by the photohead by permitting the setting for each aperture of the number of flashes to be generated per spot diameter or other increment of line length with such setting preferably being variable to suit the photohead to changes in desired quality, to changes in the photosensitive surface to be exposed or to changes in other factors.

A still further object of the invention is to provide an apparatus and method of the aforegoing character wherein the need for filters associated with the apertures is eliminated, thus avoiding the expense of the filters and also permitting each line drawing aperture to be used as a pad flashing aperture.

Other objects and advantages of the invention will become apparent from the following description taken in conjunction with the accompanying drawings and the claims.

SUMMARY OF THE INVENTION

The invention resides in an apparatus and method for exposing lines on a photosensitive surface by means of flashes of light which overlap one another to synthesize a line. A photohead is moveable relative to a photosensitive surface and has a flash lamp and a plurality of apertures of different size any selected one of which may be moved between the flash lamp and the photosensitive surface to cause the spot exposed by each flash of the lamp to have a size directly related to that of the selected aperture. As the photohead is moved relative to the photosensitive surface a speed signal is generated having a value directly related to the photohead speed.

This speed signal is in turn divided by a divisor or division factor to produce a flash rate command signal which is supplied to the photohead to control the flash rate of the flash lamp.

The apertures have associated with them on a one-to-one basis a plurality of division factors, and the division factor associated with the selected aperture is the one used to perform the dividing function on the speed signal to produce the flash rate command signal. This causes the number of flashes per spot diameter to be individually set for each aperture.

The invention also resides in the plurality of division factors being provided by a computer memory or other means allowing the division factors to be easily changed at the will of an operator thereby giving the operator precise control over the quality of line generated by each aperture.

The invention also resides in the flash lamp having a maximum achievable flash rate and in a means for associating with each aperture, as for example by means of a computer memory, a velocity limit quantity or signal which is used to limit the speed of the photohead to a speed at which the flash lamp is operated at a flash rate at or slightly below its maximum achievable flash rate.

BRIEF DESCRIPTION OF THE DRAWINGS

FIG. 1 is a schematic view showing an apparatus embodying the invention.

FIG. 2 is a perspective view showing a portion of the photohead and of the photosensitive material of the apparatus of FIG. 1.

FIG. 3 is a view showing in graphical form the speed vs. time characteristic of the apparatus of FIG. 1 for two different apertures.

DETAILED DESCRIPTION OF THE PREFERRED EMBODIMENT

An apparatus embodying the invention is shown generally at 10 in FIG. 1 and comprises basically a photoplotter 12 and an associated control system 14.

The photoplotter 12 includes a table 16 having an upwardly facing horizontal support surface 18 for supporting a sheet 20 having an upwardly facing photosensitive surface 22. An X-carriage 24 is movable in the illustrated X-coordinate direction by an associated drive motor 26. For example, the drive motor 26 may rotate in unison two pinions (not shown) located at opposite ends of the carriage 24 and each engaging a rack extending along the associated side edge of the table. The X-carriage 24 supports a Y-carriage 28 for movement relative to the X-carriage in the illustrated Y-coordinate direction, the power for such motion, for example, being an associated motor 30 carried by the carriage 24 which turns a lead screw 32 also carried by the carriage 24. A photohead 34 is carried by the Y-carriage 28 and is operable in a flashing manner to repetitively project a spot 36 of light onto the photosensitive surface 22. Therefore, by moving the photohead 34 along a desired line or trace relative to the sheet 20, by simultaneously driving the carriage 24 and carriage 28 in the X- and Y-coordinate directions, while the photohead is operated to repetitively project spots of light, a line, such as the line 38, may be exposed on the photosensitive surface 22 provided the speed of the photohead relative to the photosensitive surface is so related to the flash rate of the photohead that the projected spots overlap one another on the photosensitive surface.

The exposure of lines on the photosensitive surface 22 is usually done for the purpose of creating some sort of graphic such as that of a printed circuit mask, on the sheet 20, and such graphic usually involves the drawing of lines of many different widths. To allow for the exposure of different width lines, the photohead 34 has a large number of apertures of different size any one which may be selectively positioned between the flash lamp and the photosensitive surface 22 to control the size of the spot 36 exposed with each flash of the lamp. The arrangement and manner of selecting the apertures may vary widely. FIG. 2, by way of example, shows the apertures to be provided by an aperture wheel 40 forming part of the photohead 34 and including a plurality of aperture plates 42,42 arranged along its outer periphery with each aperture plate 42 having an aperture 44, the size of which varies from aperture plate to aperture plate. Associated with the aperture wheel 40 is a flash lamp 46 located above the wheel. The wheel is rotatable about a vertical axis 48 by a motorized aperture select mechanism 50, in response to an aperture select signal appearing on an input line 52, to bring any selected one of the apertures 44,44 of the wheel into the path of the light emitted by the flash lamp during each flash. The light passing through the selected aperture 44 is then projected onto the photosensitive surface 22 of the sheet 25 by a projecting lens system 54 so that a focused spot 36 is imaged onto the photosensitive surface 22 during each flash of the lamp with the spot having a size directly related to the size of the selected aperture 44. Within the broader aspects of the invention, the apertures may have various shapes, but in the ususal case, and as illustrated, the apertures are circular in shape so that their sizes may be defined, as is hereinafter done, in terms of their diameters or in terms of the diameters of the spots exposed by the apertures. Hereinafter, the "size" of an aperture is taken to be the diameter of the spot 36 which it creates on the surface 22. That is, a 30 mil aperture is one which creates a spot having a 30 mil diameter.

As also shown in FIG. 2, the flashing of the flash lamp 46 is controlled by a flashing circuit 56 which causes the lamp 46 to flash at a rate commanded by a flash rate command signal appearing on an input line 58. At this point it should be noted that a flash lamp in combination with its flashing circuit has a maximum achievable flash rate. That is, any attempt to drive the flash lamp at a higher rate causes it to miss flashes, to produce flashes of low intensity or to otherwise malfunction. In the illustrated case the maximum achievable flash rate for the flash lamp 46 is taken to be 5 KC.

Referring again to FIG. 1, the control system 14 for the photoplotter 12 may vary in detail but basically includes a controller 60, having a computer, of generally known construction for controlling the movement of the photohead 34 relative to the sheet 20 in the X and Y coordinate directions and for otherwise controlling and supervising the functioning of the photohead 34 to cause it to expose the desired lines on the sheet 20. The motors 26 and 30 may be servo motors responsive to analog signals supplied by the controller 60, but in the illustrated case they are taken to be step motors each supplied with stepping pulses from the controller 60 through the lines 62 and 64 respectively. Associated with the controller 60 is a tachometer means 66 which provides a speed signal on the line 68 having a value directly related to the speed of the photohead 34 relative to the photosensitive surface 22. Again, this tachometer means may take various different forms depending on the nature of the drive system used to move the photohead, but in the illustrated case, and by way of example, the tachometer means 66 includes an X-tachometer 70 associated with the line 62 and a Y-tachometer 72 associated with the line 64. The X-tachometer senses the stepping pulses appearing on the line 62 and produces an output signal X on the line 74 related to the frequency of the stepping pulses on line 62 and accordingly related to the speed at which the photohead is driven in the X-coordinate direction. Likewise, the Y-tachometer 72 produces a signal Y on the line 76 related to the speed of movement of the photohead 34 in the Y-coordinate direction. These two signals X and Y are then combined in the computing circuit 78 to produce an output voltage signal V having a value related to the resultant speed of the photohead relative to the photosensitive surface. This voltage signal V is supplied to a voltage to frequency circuit 80 which produces as the speed signal on the line 68 a chain of speed pulses 82,82 having a repetition rate directly related to the speed of the photohead relative to the photosensitive surface.

The flash lamp 46 is flashed at a rate dependent on the speed of the photohead 34 relative to the photosensitive surface. To achieve this the speed signal appearing on the line 68 is divided by a divisor or division factor to produce a flash rate command signal supplied to the line 52. In the system of FIG. 1 this division is performed by a dividing circuit 84 using a division factor supplied through the lines 86 by a memory 88. The memory 88 stores a plurality of division factors associated on a one-to-one basis with the apertures 44,44 of the aperture wheel 40 and operates when a particular aperture is selected by the aperture select signal appearing on line 52 to supply the division factor associated with that aperture to the dividing circuit 84 through the lines 86.

The size of the selected aperture in combination with the rate at which the flash lamp is flashed for a given speed of movement of the photohead determines the number of flashes produced per spot diameter, and thus the division factor sent to the dividing circuit 84 by the memory 88 for each selected aperture sets a precise value on the number of flashes produced for each diameter of movement along the line to be exposed. Preferably, the memory is so constructed that the information stored in it can be easily varied at the will of the operator to change the value of the division factor associated with each aperture. For this purpose, as shown in FIG. 1, the memory may have associated with it a keyboard 90 or similar device allowing the operator to make changes in the stored information.

In addition to supplying the dividing circuit 84 with a division factor for each selected aperture, the memory 88 also, for each selected aperture, provides the controller 60 with a velocity limit signal over the line 92. This velocity limit signal has a magnitude argument, such as a digitally encoded quantity, having a value directly related to a limit velocity at which the photohead 34 is to be driven relative to the photosensitive surface 22. This limit velocity is in turn so related to the size of the selected aperture, the division factor and the maximum achievable flash rate of the flash lamp that when the photohead is driven at the limit velocity the flash lamp will be flashed at a rate equal to or slightly less than the maximum achievable flash rate. Thus, for each selected aperture the photohead is driven at as fast a maximum speed as possible taking into account the maximum achievable flash rate of the flash lamp and the desired quality of the exposed line.

The memory 88 may separately store a plurality of division factors for the plurality of apertures and also separately store a plurality of velocity limit signals for the apertures, or it may include computing circuitry for computing one or the other of such factors and signals from other quantities stored in the memory. Given the size of the selected aperture, the maximum achievable velocity or turning speed of the photohead and the maximum achievable flash rate of the flash lamp the (1) division factor, (2) velocity limit signal and (3) the number flashes per spot diameter are so interelated that only one of these three quantities need be selected and stored in the memory, the other two values being calculatable from the selected one.

For simplifying the design of the dividing circuit 84 the division factors preferably are restricted to whole numbers and are the quantities which are directly subject to change by the operator in the first instance.

Given the desired division factor to use with a given aperture, the velocity limit associated with the aperture can be found by the following equation:

$$V_L = \frac{DF \cdot VHm \cdot FLm}{FTm} \quad \text{(equation 1)}$$

where:

$V_L$ = velocity limit in inches per minute of the photohead relative to the photosensitive surface for a given aperture.

DF = division factor

VHm = maximum achievable velocity (tracing speed) in inches per minute of the photohead relative to photosensitive surface.

$FL_m$ = maximum achievable flash rate of the flash lamp in flashes per second.

$FT_m$ = repetition rate of speed pulses in pulses per second output by the tachometer at the maximum achievable velocity ($VH_m$) of the photohead relative to the sheet.

Also, given the division factor to use with a given aperture, the number of flashes per spot diameter it will produce is given by the following equation:

$$N = \frac{FT_m \cdot D \cdot 60}{VH_m \cdot DF} \quad \text{(equation 2)}$$

where:

N = number of flashes per spot diameter
D = spot diameter in inches

Assuming:

A maximum achievable flash rate, $FL_m$ of 5 KC, a maximum tracing speed, $VH_m$ of 3600 inches per minute, and a maximum output of the tachometer, $FT_m$ of 450 KC an exemplary schedule of division factors, velocity limits and flashes per spot diameter associated with a set of apertures may, for example, be as follows:

| Aperture (Spot) Size (mils) | Division Factor | Velocity Limit (Inches per min) | Flashes Per Spot Diameter |
|---|---|---|---|
| 2 | 5 | 200 | 3.00 |
| 4 | 9 | 360 | 3.33 |
| 8 | 10 | 400 | 6.00 |
| 10 | 11 | 440 | 6.82 |
| 20 | 19 | 760 | 7.9 |
| 30 | 25 | 1000 | 9.00 |

-continued

| Aperture (Spot) Size (mils) | Division Factor | Velocity Limit (Inches per min) | Flashes Per Spot Diameter |
|---|---|---|---|
| 40 | 30 | 1200 | 10.00 |
| 50 | 35 | 1400 | 10.71 |
| 80 | 50 | 2000 | 12.00 |
| 120 | 70 | 2800 | 12.86 |
| 160 | 90 | 3600 | 13.33 |

The operation of the FIG. 1 system in drawing a line with a thirty mil aperture (spot size) and another line with an 80 mil aperture (spot size), assuming the conditions of the table set out above, is shown in FIG. 3. Considering the line drawn with the 30 mil aperture, the plotter 34 starts at zero speed at the beginning of the line. The speed is then gradually increased by the controller 60, during the "up-ramp" portion of the process, until the velocity limit speed of 1000 inches per minute is reached as dictated by the velocity limit signal supplied by the memory 88 to the computer 60. Point A represents the reaching of this limit velocity, and this limit velocity is maintained until reaching point B after which the plotter speed is reduced gradually until the end of the line is reached at point C, the phase from point B to point C being the "down-ramp" portion of the process. A feature of the invention is that during all phases of this line drawing process—that is, during the "up-ramp" portion OA, during the constant velocity portion AB and, during the "down-ramp" portion BC, the number of flashes per spot diameter remains constant, the number of flashes per spot diameter for the 30 mil aperture of FIG. 3 being 9.

In the case of the 80 mil aperture illustrated in FIG. 3 the line drawing process is substantially the same as that for the 30 mil aperture except for the photohead reaching a higher limit speed. That is, when drawing with the 80 mil aperture the photohead 34 undergoes a gradual increase in speed between the points 0 and D until reaching the limit velocity of 2000 inches per minute dictated by the velocity limit signal supplied by the memory 88 to the controller 60. This limit velocity is maintained until the point D, after which the photohead speed is gradually reduced between the points E and F. During all phases of this drawing with the 80 mil aperture the exposure takes place at the rate of 12 flashes per spot diameter as set out in the table. Of course, it will be understood that by changing the division factors from those shown in the above table other numbers of flashes per spot diameter may be obtained for any aperture to vary the quality of the line exposed by that aperture.

I claim:

1. An apparatus for exposing lines on a photosensitive surface by flashes of light, said apparatus comprising:
    means for supporting material having a photosensitive surface,
    a photohead having a flash lamp and a plurality of apertures of different size any selected one of which apertures may be positioned between said flash lamp and said photosensitive surface to cause said flash lamp when flashed to expose a spot on said surface having a size directly related to the size of said selected aperture,
    means for selecting any one of said plurality of apertures to be used with said lamp to expose spots on said surface,
    drive means for moving said material and said photohead relative to one another to cause said photohead to trace a line to be exposed on said photosensitive surface,
    means for producing a speed signal having a value directly related to the speed at which said photosensitive surface and photohead are driven relative to one another by said drive means,
    a divider for dividing said speed signal by a division factor to produce a flash rate command signal,
    means for flashing said flash lamp at a rate directly related to said flash rate command signal, and,
    means for associating a plurality of division factors with said apertures on a one-to-one basis, which division factors are independent of one another and may vary from aperture to aperture, and for using with said divider the division factor associated with the aperture selected by said selecting means.

2. An apparatus for exposing lines on a photosensitive surface as defined in claim 1 further characterized by means for varying the division factor associated with each of said apertures independently of the division factors associated with the other of said apertures.

3. An apparatus as defined in claim 1 further characterized by said flash lamp having a maximum achievable flash rate, and means for limiting for each selected aperture the speed at which said drive means drives said photosensitive surface and said photohead relative to one another to a speed at which said flash lamp is commanded by said flash rate command signal to flash at or below said maximum achievable flash rate.

4. An apparatus for exposing lines on a photosensitive surface by flashes of light, said apparatus comprising:
    means for supporting material having a photosensitive surface,
    a photohead having a flash lamp and a plurality of apertures of different size any selected one of which apertures may be positioned between said flash lamp and said photosensitive surface to cause said flash lamp when flashed to expose a spot on said surface having a size directly related to the size of said selected aperture,
    means for selecting any one of said plurality of apertures to be used with said lamp to expose spots on said surface,
    drive means for moving said material and said photohead relative to one another to cause said photohead to trace a line to be exposed on said photosensitive surface,
    a lamp flashing circuit connected with said lamp for causing said lamp to flash once in response to each flash command pulse supplied to said circuit,
    a tachometer means for producing a chain of speed pulses having a repetition rate directly related to the speed at which said photosensitive surface and photohead are driven relative to one another by said drive means,
    a divider for dividing said chain of speed pulses by a division factor to produce an output chain of flash command pulses supplied to said lamp flashing circuit, and
    means for associating a plurality of division factors with said apertures on a one-to-one basis, which division factors are independent of one another and may vary from aperture to aperture, and for using with said divider the division factor associated with the aperture selected by said selecting means.

5. An apparatus for exposing lines on a photosensitive surface as defined in claim 4 further characterized by means for varying the division factor associated with each of said apertures independently of the division factors associated with the other of said apertures.

6. An apparatus for exposing lines on a photosensitive surface as defined in claim 4 further characterized by said means for associating a plurality of division factors with said apertures comprising a computer memory in which a division factor is stored for each of said plurality of apertures of said photohead.

7. A system for exposing lines on a photosensitive surface as defined in claim 4 further characterized by said computer memory permitting changing of said stored division factors, and a means including a keyboard connectable with said computer memory to change at the will of an operator the values of said division factors stored in said memory.

8. An apparatus for exposing lines on a photosensitive surface as defined in claim 4 further characterized by said flash lamp having a maximum achievable flash rate, said drive means for moving said material and photohead relative to one another being responsive to a velocity limit signal having a magnitude argument and said drive means operating to limit the velocity at which said photohead is movable relative to said material to a value directly related to said magnitude argument, and means for associating with each of said apertures a velocity limit signal having a magnitude argument, the value of said magnitude argument of said velocity limit signal being so related to the division factor associated with the same aperture that when said photohead and said photosensitive surface are moved relative to one another at the limit velocity dictated by said velocity limit signal said flash lamp will be commanded by said flash command pulses to flash at or below said maximum achievable flash rate.

9. An apparatus as defined in claim 8 further characterized by said means for associating a plurality of divison factors with said apertures and said means for associating with each of said apertures a velocity limit signal comprising a computer memory in which a division factor and a velocity limit signal is stored for each of said plurality of apertures of said photohead.

10. A method for exposing lines on a photosensitive surface by flashes of light, said method comprising the steps of:
providing a photosensitive surface,
providing a photohead having a flash lamp and a plurality of apertures of different size any selected one of which apertures may be positioned between said flash lamp and said photosensitive surface to cause said flash lamp when flashed to expose a spot on said photosensitive surface having a size directly related to the size of said selected aperture,
selecting one of said apertures for use with said flash lamp,
driving said photosensitive surface and said photohead relative to one another to cause said photohead to trace a line to be exposed on said surface,
during said movement of said photohead and surface relative to one another producing a speed signal having a value directly related to the speed of said photohead and surface relative to one another,
associating a plurality of division factors with said apertures on a one-to-one basis, said division factors being independent of one another and possibly varying from aperture to aperture,
dividing said speed signal by the division factor associated with the selected aperture used with said flash lamp to produce a flash rate command signal, and
flashing said flash lamp at a rate directly related to said flash rate command signal.

11. A method for exposing lines on a photosensitive surface as defined in claim 10 further characterized by limiting the speed at which said photohead and surface are moved relative to one another to a speed at which said lamp is commanded by said flash rate command signal to flash at or below its maximum achievable flash rate.

12. A method for exposing lines on a photosensitive surface by flashes of light, said method comprising the steps of:
providing a photosensitive surface,
providing a photohead having a flash lamp and a plurality of apertures of different size any selected one of which apertures may be positioned between said flash lamp and said sheet to cause said flash lamp when flashed to expose a spot on said sheet having a size directly related to the size of said selected aperture,
selecting one of said apertures for use with said flash lamp,
driving said photohead and said photosensitive surface relative to one another to cause said photohead to trace a line to be exposed on said surface,
during said movement of said photohead and said surface relative to one another producing a speed signal having a value directly related to the speed of said photohead and said surface relative to one another,
associating a plurality of division factors with said apertures on a one-to-one basis, said division factors being independent of one another and possibly varying from aperture to aperture,
dividing said chain of speed pulses by the division factor associated with the selected aperture used with said flash lamp to produce an output chain of flash command pulses, and
flashing said flash lamp in response to each of said flash command pulses.

13. A method for exposing lines on a photosensitive surface as defined in claim 12 further characterized by limiting the speed at which said photohead and surface are moved relative to one another to a speed at which said lamp is commanded by said flash command pulses to flash at or below its maximum achievable flash rate.

* * * * *